United States Patent
Oe

(10) Patent No.: US 10,481,829 B2
(45) Date of Patent: Nov. 19, 2019

(54) INFORMATION PROCESSING APPARATUS, NON-TRANSITORY COMPUTER-READABLE RECORDING MEDIUM HAVING STORED THEREIN A PROGRAM FOR CONTROLLING STORAGE, AND METHOD FOR CONTROLLING STORAGE

(71) Applicant: FUJITSU LIMITED, Kawasaki-shi, Kanagawa (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 15/826,800

(22) Filed: Nov. 30, 2017

(65) Prior Publication Data
US 2018/0181343 A1 Jun. 28, 2018

(30) Foreign Application Priority Data
Dec. 22, 2016 (JP) ................................. 2016-249303

(51) Int. Cl.
*G06F 3/06* (2006.01)
*G06F 12/0862* (2016.01)

(52) U.S. Cl.
CPC .......... *G06F 3/0653* (2013.01); *G06F 3/0604* (2013.01); *G06F 3/068* (2013.01); *G06F 3/0611* (2013.01); *G06F 3/0647* (2013.01); *G06F 3/0673* (2013.01); *G06F 3/0685* (2013.01); *G06F 12/0862* (2013.01); *G06F 2212/1021* (2013.01); *G06F 2212/6024* (2013.01); *G06F 2212/6026* (2013.01)

(58) Field of Classification Search
CPC .... G06F 3/0653; G06F 3/0604; G06F 3/0647; G06F 3/0673
See application file for complete search history.

(56) References Cited

U.S. PATENT DOCUMENTS

| | | | |
|---|---|---|---|
| 5,893,139 A * | 4/1999 | Kamiyama | G06F 12/122 711/113 |
| 2012/0173831 A1 * | 7/2012 | Rubio | G06F 3/0605 711/165 |
| 2015/0220280 A1 | 8/2015 | Ishizaki | |

FOREIGN PATENT DOCUMENTS

| JP | 5-225167 | 9/1993 |
|---|---|---|
| JP | 5707540 | 4/2015 |

* cited by examiner

*Primary Examiner* — Nanci N Wong
(74) *Attorney, Agent, or Firm* — Fujitsu Patent Center

(57) ABSTRACT

An IO access concentration is precisely predicted by comparing first concentration state tendency information and second concentration state tendency information indicating a tendency of a concentration state of a unit region being in the concentration state, the first concentration state tendency information being collected during a first time period, the second concentration state tendency information being collected during a second time period prior to the first time period, and when the first concentration state tendency information is detected to vary by a standard value or more from the second concentration state tendency information, regenerating a data access prediction information by excluding a data access history collected during the second time period.

9 Claims, 14 Drawing Sheets

FIG. 3

IO ACCESS CONCENTRATION
MANAGEMENT TABLE

| ID | Start sub-LUN | End sub-LUN | Start time |
|----|---------------|-------------|------------|
| 0  | 23            | 26          | 300        |
| 1  | 36            | 40          | 301        |
|    | ......        | ......      | ......     |

FIG. 5

| DURATION TIME (SEC) (A) | SAMPLING NUMBER (B) | C=A*B | AVERAGE DURATION TIME (SEC) (D) | REMAINING DURATION TIME (SEC) (E=D-A) |
|---|---|---|---|---|
| 1 | 35000 | 35000 | 5.68 | 4.68 |
| 2 | 20000 | 40000 | 10.45 | 8.45 |
| 3 | 9000 | 27000 | 19.61 | 16.61 |
| 4 | 8000 | 32000 | 30.61 | 26.61 |
| 5 | 6500 | 32500 | 55.44 | 50.44 |
| 10 | 1200 | 12000 | 150.74 | 140.74 |
| 20 | 300 | 6000 | 226.56 | 206.56 |
| 30 | 260 | 7800 | 255.72 | 225.72 |
| 40 | 240 | 9600 | 287.18 | 247.18 |
| 50 | 200 | 10000 | 323.69 | 273.69 |
| 60 | 180 | 10800 | 362.11 | 302.11 |
| 120 | 180 | 21600 | 405.78 | 285.78 |
| 180 | 160 | 28800 | 454.08 | 274.08 |
| 240 | 140 | 33600 | 502.54 | 262.54 |
| 300 | 100 | 30000 | 550.59 | 250.59 |
| 360 | 85 | 30600 | 588.27 | 228.27 |
| 420 | 70 | 29400 | 621.72 | 201.72 |
| 480 | 40 | 19200 | 649.41 | 169.41 |
| 540 | 90 | 48600 | 663.83 | 123.83 |
| 600 | 100 | 60000 | 693.16 | 93.16 |
| 660 | 120 | 79200 | 726.43 | 66.43 |
| 720 | 70 | 50400 | 776.25 | 56.25 |
| 780 | 50 | 39000 | 820.00 | 40.00 |
| 840 | 20 | 16800 | 870.00 | 30.00 |
| 900 | 20 | 18000 | 900.00 | 0.00 |

1041

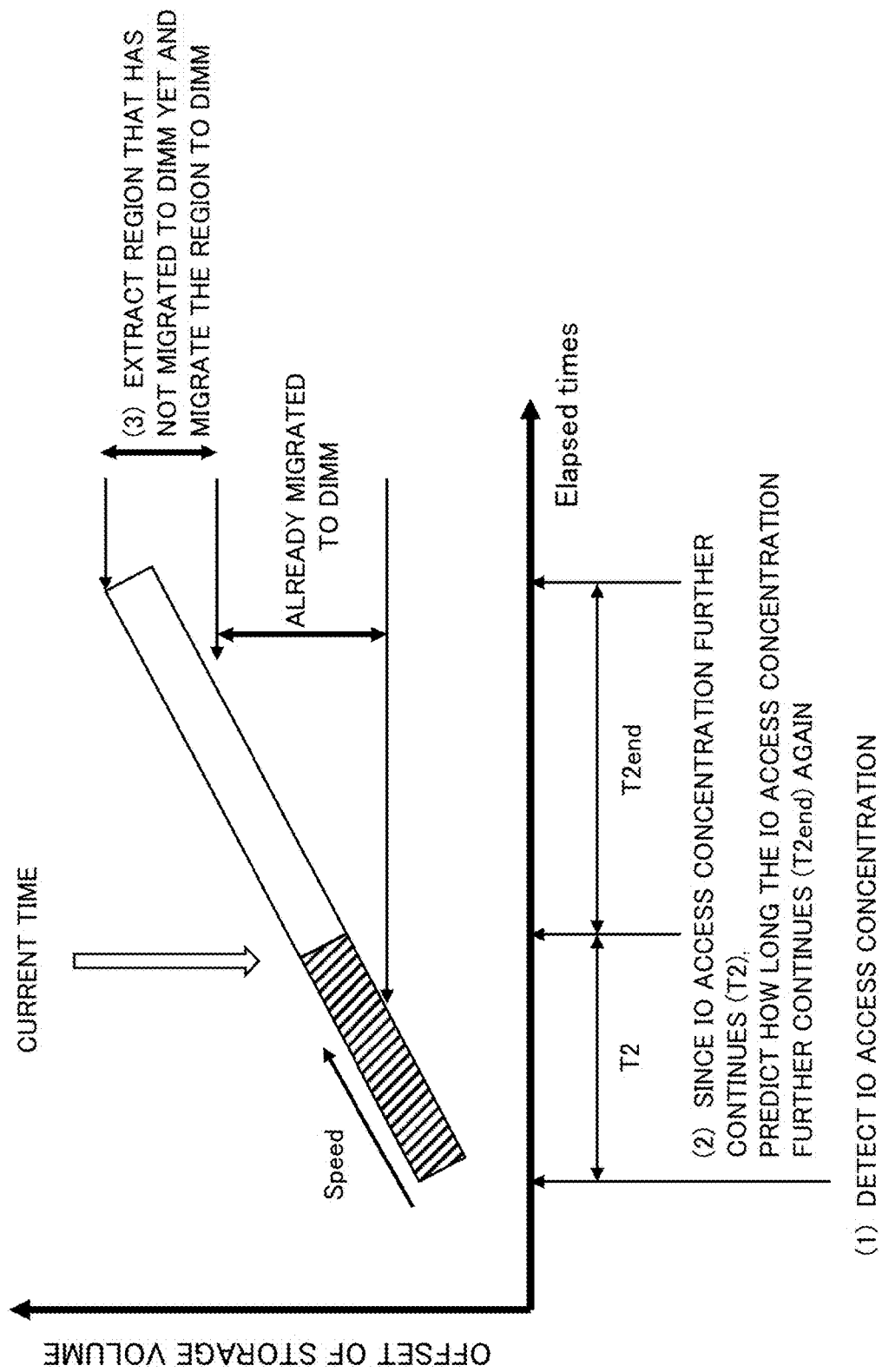

INFORMATION PROCESSING APPARATUS, NON-TRANSITORY COMPUTER-READABLE RECORDING MEDIUM HAVING STORED THEREIN A PROGRAM FOR CONTROLLING STORAGE, AND METHOD FOR CONTROLLING STORAGE

CROSS-REFERENCE TO RELATED APPLICATION

This application is based upon and claims the benefit of priority of the prior Japanese Patent application No. 2016-249303, filed on Dec. 22, 2016, the entire contents of which are incorporated herein by reference.

FIELD

The embodiment discussed herein is directed to an information processing apparatus, a storage controlling program, and a method for controlling storage.

BACKGROUND

In a storage device, Input Output accesses sometimes concentrate on a particular narrow storing region. As an exemplary known solution to the above, in a tiered storage system including a Hard Disk Drive (HDD) and a semiconductor memory device, data stored in a region in the HDD on which region IO accesses concentrate is migrated to a Solid State Drive (SSD), which has a high access speed, so that decline in throughput due to the IO accesses concentration can be avoided.

Besides, a storage system predict a time for which such an IO access concentration continues. Specifically, each time an IO access concentration occurs, the duration time of the IO access concentration is measured; the total of the duration times in a unit of a relatively long span such as one day is calculated; and the duration time of the next IO access concentration is predicted by referring to the total.
[Patent Literature 1] Japanese Laid-open Patent Publication No. HEI 5-225167
[Patent Literature 2] Japanese Patent No. 5707540

However, a typical storage device predicts a duration time of an IO access concentration, using a total duration time of a long span, such as the sum in a unit of one day. Accordingly, in cases where the distribution of the duration time of IO concentration changes in the course of a day, analysis is to be carried out using a total having both data before and data after the change. This lowers the accuracy in predicting after the tendency of an IO access concentration changes, so that predicting related to an IO access concentration comes to be inaccurate.

SUMMARY

According to an aspect of an embodiment, an information processing apparatus includes a storing device; a generator that generates data access prediction information in relation to the storing device on the basis of a data access history to a unit region of the storing device; a comparator that compares first concentration state tendency information and second concentration state tendency information, the first concentration state tendency information being collected during a first time period and indicating a tendency of a concentration state of a unit region being in the concentration state on which unit region data accesses are concentrating in the storage device, the second concentration state tendency information being collected during a second time period prior to the first time period and indicating a tendency of the concentration state of the unit region in the concentration state. In a case where the first concentration state tendency information is detected to vary by a standard value or more from the second concentration state tendency information as a result of the comparing by the comparator, the generator regenerates the data access prediction information by excluding a data access history collected during the second time period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of IO access concentration managing information of a tired storage device of the first embodiment;
FIG. 5 is a diagram illustrating a remaining duration time table in a tired storage device of the first embodiment;
FIG. 10 is a diagram illustrating a method for predicting a region at which an IO access concentration occurs by a migration determiner in a tired storage device of the first embodiment.

DESCRIPTION OF EMBODIMENT(S)

Hereinafter, an information processing apparatus, a storage controlling program, and a method for controlling storage according to a first embodiment will now be detailed with reference to the accompanying drawings. The following first embodiment is exemplary and has no intention to exclude various modifications and applications of techniques not referred in the first embodiment. In other words, various changes and modifications can be suggested without departing from the concept of the first embodiment. The drawings do not illustrate therein all the functions and elements included in the embodiment and may include additional functions and elements to those illustrated in the accompanying drawings.

Figure 1:
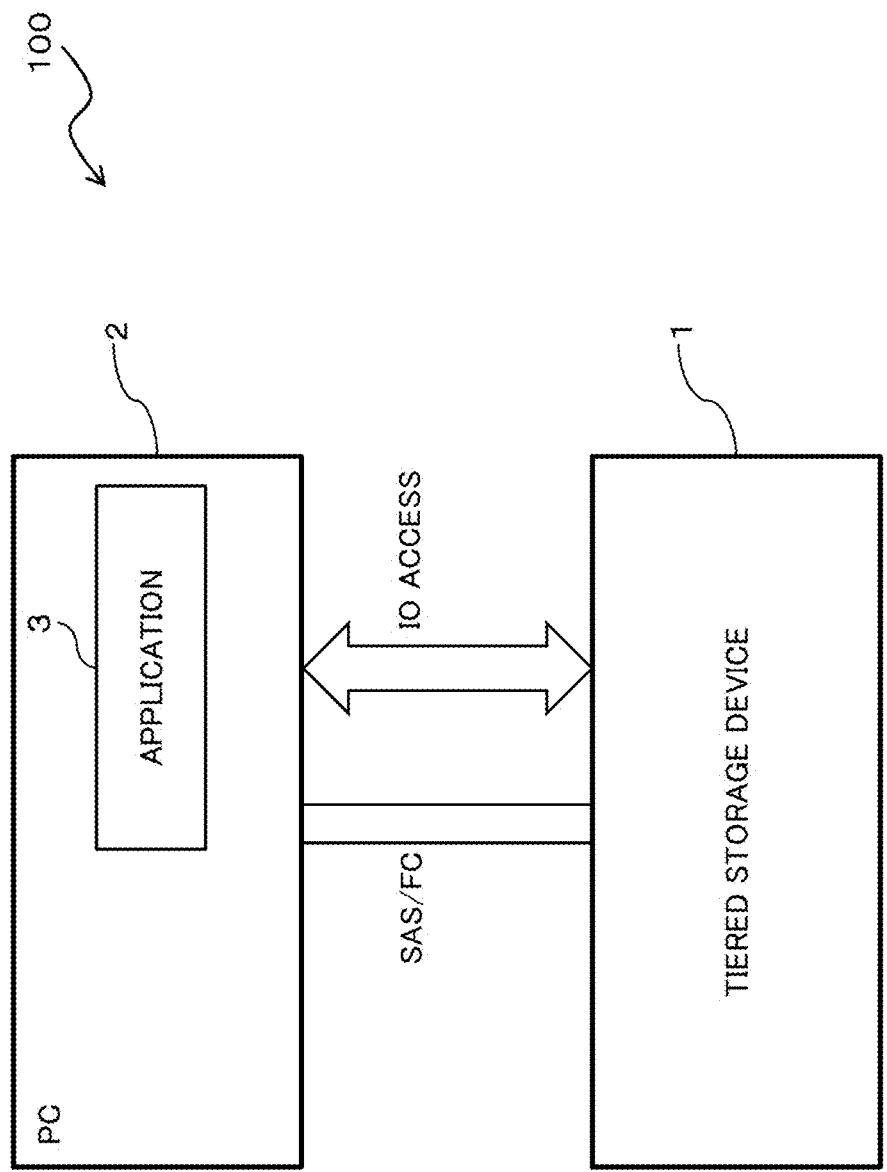
FIG. 1 is a diagram illustrating an example of the configuration of a storage system including a tiered storage device according to a first embodiment.

(1) Configuration (1-1) Example of Configuration of a Storage System:

FIG. 1 is a diagram illustrating an example of the configuration of a storage system 100 including a tiered storage device 1 according to a first embodiment.

As illustrated in FIG. 1, the storage system 100 includes a host device 2 such as a Personal Computer (PC) and the tiered storage device 1. The host device 2 and the tiered storage device 1 are connected to each other via an interface such as a Serial Attached Small Computer System Interface (SAS) or a Fiber Channel (FC).

The host device 2 includes a non-illustrated processor such as a Central Processing Unit (CPU) and achieves various functions by the processor executing an application 3.

The tiered storage device 1 includes multiple types of storing devices (in the example of FIG. 2, an SSD 20 and a Dual Inline Memory Module (DIMM) 30) and provides the storing regions of these storing device to the host device 2 as to be detailed below. Into the storage regions that the tiered storage device 1 provides, data generated by the host device 2 as a result of execution of the application 3 and data to be used to execute the application 3 are stored.

An IO access (data access) occurs when the host device 2 reads and writes data from and into a storing region of the tiered storage device 1.

Figure 2:
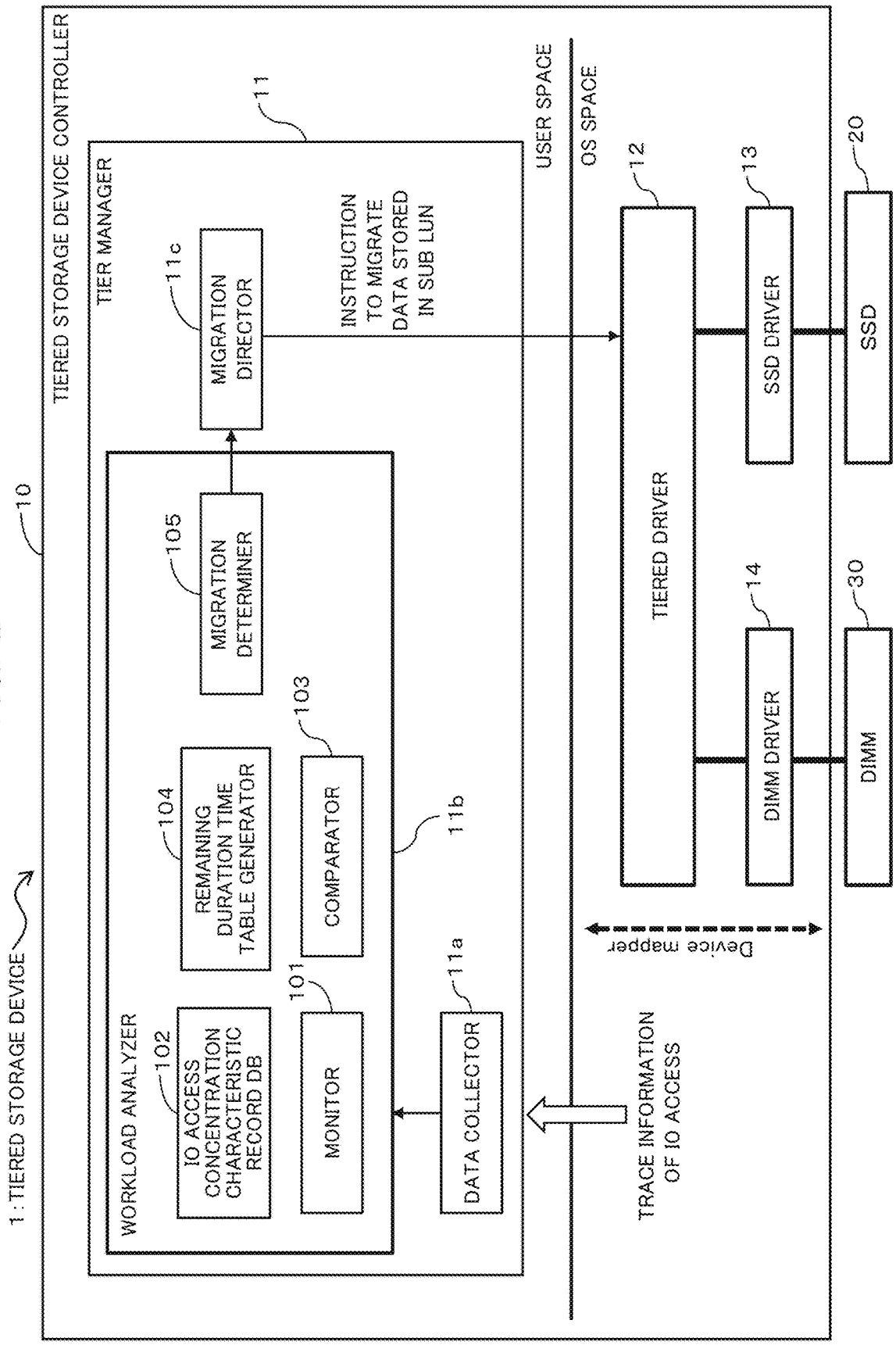
FIG. 2 is a diagram illustrating a functional configuration of a tired storage device of the first embodiment.

(1-2) Example of a Functional Configuration of a Tired Storage Device:

FIG. 2 is a diagram illustrating a functional configuration of the tiered storage device 1 of the first embodiment. As illustrated in FIG. 2, the tiered storage device (storage device) 1 includes a tired storage controller (storage controller) 10, the SSD 20, and the DIMM 30.

The tired storage controller 10 is a storage controller that makes various accesses to the SSD 20 and the DIMM 30 in response to IO accesses from the host device 2. For example, the tired storage controller 10 makes an access for reading and writing data from and into the SSD 20 and the DIMM 30. Examples of the tired storage controller 10 includes an information processing apparatus such as a PC, a server, and a Controller Module (CM).

The tired storage controller 10 of the first embodiment achieves dynamic tire control that arranges a region having a low access frequency in the SSD 20 while arranges a region having a high access frequency in the DIMM 30 in accordance with the frequency of IO accesses.

The DIMM (first storing device) 30 is an example of a storing device that stores various pieces of data and programs and the SSD (second storing device) 20 is an example of a storing device having different performance (e.g., lower in speed) from that of the DIMM 30. In the first embodiment, a semiconductor memory module such as the DIMM 30 and a semiconductor drive device such as the SSD 20 are regarded as examples of storing devices being different from each other (sometimes may be referred to as first and second storing devices). However, the storing devices are not limited to the SSD 20 and the DIMM 30. Alternatively, satisfactory first and second storing devices may be storage devices having a difference in performance (e.g., speed of reading/writing).

The SSD 20 and the DIMM 30 configure the storage volumes of the tiered storage device 1.

Hereinafter, a storage volume recognized by the host device 2 or other devices is referred to a Logical Unit Number (LUN). In addition, a unit (unit region) obtained by dividing a LUN by a predetermined size is referred to a sub LUN. Here, the size of a sub LUN can be arbitrary changed in the order from MegaByte (MB) to GigaByte (GB). A sub LUN is sometimes referred to as a segment.

Each of the SSD 20 and the DIMM 30 includes one or more storing regions that are capable of storing data of sub LUNs (unit regions) of the storage volumes. The tired storage controller 10 controls move of a region in a unit of a sub LUN between the SSD 20 and the DIMM 30. Hereinafter, move of data between a storing region of the SSD 20 and a storing region of the DIMM 30 is sometimes referred to as "migration".

In FIG. 2, the tiered storage device 1 includes a single SSD 20 and a single DIMM 30, but the number of SSDs 20 and the number of DIMMs 30 are not limited to one. The tiered storage device 1 may include multiple SSDs 20 and/or multiple DIMMs 30.

Next description will now be made in relation to the details of the tired storage controller 10. As illustrated in FIG. 2, the tired storage controller 10 exemplarily includes a tier manager 11, a tier driver 12, an SSD driver 13, and a HDD driver 14. For example, the tier manager 11 is achieved in the form of a program being executed in the user space, and the tier driver 12, the SSD driver 13, and the HDD driver 14 are achieved in the form of a program being executed in the Operating System (OS) space.

The present embodiment assumes that the tired storage controller 10 uses the function of, for example, Linux® device mapper. The device mapper deals with IOs to a highly loaded region by monitoring the storage volumes in a unit of a LUN and migrating the data in a LUN being highly loaded from the SSD 20 to the DIMM 30. The device mapper is implemented as a computer program.

The tier manager 11 analyzes data accesses to sub LUNs and thereby specifies a sub LUN storing data to be migrated from the SSD 20 to the DIMM 30 (migration candidate extraction). In addition, the tier manager 11 migrates data in a sub LUN from the SSD 20 to the DIMM 30 or from the DIMM 30 to the SSD 20.

The tier manager 11 determines a sub LUN to be subjected to region migration on the basis of information of IO traced for the SSD 20 and/or the DIMM 30 based on, for example, collected IO access information, and instructs the tier driver 12 to migrate the data in the determined sub LUN.

As illustrated in FIG. 2, the tier manager 11 includes functions as a data collector (collector) 11a, a workload analyzer 11b, and a migration director 11c.

For example, on the Linux®, the tier manager 11 is implemented as a dividing and configuration-changing engine having three components of log pool, workload analysis, and LUN migration instruction. These components of log pool, workload analysis, and LUN migration instruction achieve the functions as the data collector 11a, the workload analyzer 11b, and the migration director 11c, respectively.

The data collector (collector) 11a collects information (IO access information) of one or more IO accesses to the SSD 20 and/or the DIMM 30. For example, the data collector 11a collects the information of IOs traced for the SSD 20 and the DIMM 30 at regular intervals (e.g., every one minutes) using blktrace of the Linux®. The data collector 11*a* collects information of, for example, timestamp, Logical Block Addressing (LBA), reading/writing (r/w), and a length through IO trace. From the information of LBA, a sub LUN ID can be obtained.

Here, the blktrance is a command to trace an IO on the block IO level. Hereinafter, information of traced IO accesses is sometimes referred to as trace information. Alternatively, the data collector 11*a* may collect the IO access information using another command such as iostat, which is a command to confirm a using state of disk IO, in place of blktrace. The commands blktrace and iostat are executed in the OS space.

Then, the data collector 11*a* totals IO access numbers to each sub LUN on the basis of the collected information.

The data collector 11*a* collects information of IO accesses in a unit of a sub LUN at regular time intervals (t). Assuming that the tier manager 11 determines migration of data in a sub LUN at intervals of one minutes, the regular time interval (t) is set to be one minute.

The data collector 11*a* collects the IO number to each sub LUN and information of Avers, AversWithMg, AveMgTime, and AversDimm for the average response times.

Here, the information of "Avers" represents an access average response time to an IO access in the SSD 20 in a case where no data is to be migrated. The information of "AversWithMg" represents an average response time to an IO access in the SSD 20 in a case where data is to be migrated. The information "AveMgTime" represents an average execution time in a case where data in a single sub LUN is to be migrated. The information of "AversDimm" represents an average response time to an IO access in the DIMM 30.

The values of the IO number and the average response times of Avers, AversWithMg, AveMgTime, and AversDimm are collected or calculated by the function of, for example, the tier driver 12. The data collector 11*a* obtains these values from the tier driver 12 and then registers these values into an IO access concentration characteristic record DB 102.

The data collector 11*a* occasionally collects information of these values and registers these values into the IO access concentration characteristic record DB 102.

Hereinafter, the average response times of Avers, AversWithMg, AveMgTime, and AversDimm are sometimes referred to as parameters. These parameters are affected by operation workload and equipment such as the SSD 20 being used, and it is therefore preferable to obtain the averages of immediate previous operation in the event of determining the benefit to be brought by the prospective migration.

The data collector 11*a* may further totals an IO reading/writing ratio (rw ratio) to each individual segment and/or the entire segments and add the ratios into the above information.

The data collector 11*a* functions as an example of a collector that collects information about IO access requests input in relation to multiple unit regions being obtained by dividing regions to be used in the SSD 20 or the DIMM 30 so as to have a predetermined size.

The migration director 11*c* instructs the tier driver 12 to migrate data in a selected sub LUN from the SSD 20 to the DIMM 30 or from the DIMM 30 to the SSD 20 in obedience to an instruction (migration determination notification, migration target information) from the workload analyzer 11*b* (migration determiner 105) to be detailed below.

The workload analyzer 11*b* selects a sub LUN serving as a source of the data migration in the SSD 20 or the DIMM 30 on the basis of the IO access information collected by the data collector 11*a* and sends the information about the selected sub LUN to the migration director 11*c*.

Hereinafter, the first embodiment assumes that data is to be migrated from the SSD 20 to the DIMM 30.

As illustrated in FIG. 2, the workload analyzer 11*b* includes a monitor 101, an IO access concentration characteristic record database (DB) 102, a comparator 103, a remaining duration time table generator 104, and a migration determiner 105.

The monitor 101 detects and monitors an IO access concentration. The monitor 101 detects occurrence of an IO access concentration on the SSD 20 on the basis of the trace information of the IO accesses in a unit of a sub LUN, which trace information is collected by the data collector 11*a*.

Here, an exemplary IO access concentration represents a state where one half of all the IO accesses or more concentrate on a scope region of a predetermined percent (e.g., about 0.1 percent to several percent) of the entire volume capacity.

Upon detection of a state where IO accesses of the threshold or more (e.g., 50-90% of all the IO accesses) concentrate on the predetermined scope region described above, the monitor 101 determines that tiered storage device 1 is in the IO access concentration state.

The scope region to determine the concentration of IO accesses may be a single continuous scope region or may be the sum of discrete multiple scope regions.

A duration time of a single IO access is about 80 minutes at the longest and in a short duration case, a single IO ends within one minute.

Additionally, the monitor 101 detects the end of an IO access concentration. The end of an IO access concentration is a state where the number of IO accesses to the scope region on which IO accesses have been concentrated comes to be less than the above threshold.

In some cases, the IO access number drops for a moment and then recover soon. For the above, the monitor 101 preferably determines that an IO access concentration ends at the time when a predetermined time (e.g., N minutes) has elapsed since the IO access number to the scope region on which the IO accesses have been concentrated came to be less than the above threshold.

The monitor 101 registers information about an IO access concentration into the IO access concentration characteristic record DB 102.

The IO access concentration characteristic record DB 102 is a database that stores information about an IO access concentration detected in the tiered storage device 1. Into the IO access concentration characteristic record DB 102, IO access concentration management information, which relates to the IO access concentration, is stored.

FIG. 3 is a diagram illustrating an example of IO access concentration management information in the tiered storage device 1 of the first embodiment. In the example of FIG. 3, the IO access concentration management information is exhibited in the form of a table. Hereinafter, the IO access concentration management information in a table form is referred to as an IO access concentration management table.

The IO access concentration management information is information about an IO access concentration being occurring in the SSD 20. Information about the IO access concentration being occurring in the SSD 20 is registered as an entry form into the IO access concentration management table.

The IO access concentration management information of FIG. 3 includes fields of ID, Start sub-LUN, End sub-LUN, and Start time.

As to be detailed below with reference to FIGS. 9-11, an IO access concentration is observed as if moving within the storage volume. The "start sub-LUN" is information that specifies the starting point of a region at which the IO access concentration occurs, in other words, a sub LUN being a position of occurrence of the IO access concentration. The "End sub-LUN" is information that specifies the endpoint of the region at which the IO access concentration occurs, in other words, a sub LUN being a destination of the movement of the IO concentration.

The "Start time" represents the time when the IO access concentration occurs. The "ID" is identifier information that specifies the IO access concentration (entry) and is, for example, numbered sequentially in the order of the occurrence of IO access concentrations.

Upon detection of the occurrence of an IO access concentration, the monitor 101 registers these pieces of information into the IO access concentration management table.

Here, into the IO access concentration characteristic record DB 102, information (IO access concentration tendency information) indicating the tendency of an IO access concentration including, for example, the time of end, the duration time, the reading/writing ratio (RW ratio), average Input Output Per Second (IOPS) of the IO access concentration. These pieces of information indicate the tendency of an IO access concentration, are information to be an index, and are registered in the IO access concentration characteristic record DB 102 by the monitor 101 in association with the ID of the corresponding IO access concentration when the IO access concentration ends. Hereinafter, these pieces information of the maximum value of the duration time, the average value of the duration time, the minimum value of the duration time, and a RW ratio, and an average IOPS are sometimes referred to as IO access concentration tendency information.

It is preferable that the IO access concentration characteristic record DB 102 stores the IO access concentration tendency information in the chronological order.

The comparator 103 compares IO access concentration tendency information of multiple time sections.

Figure 4:
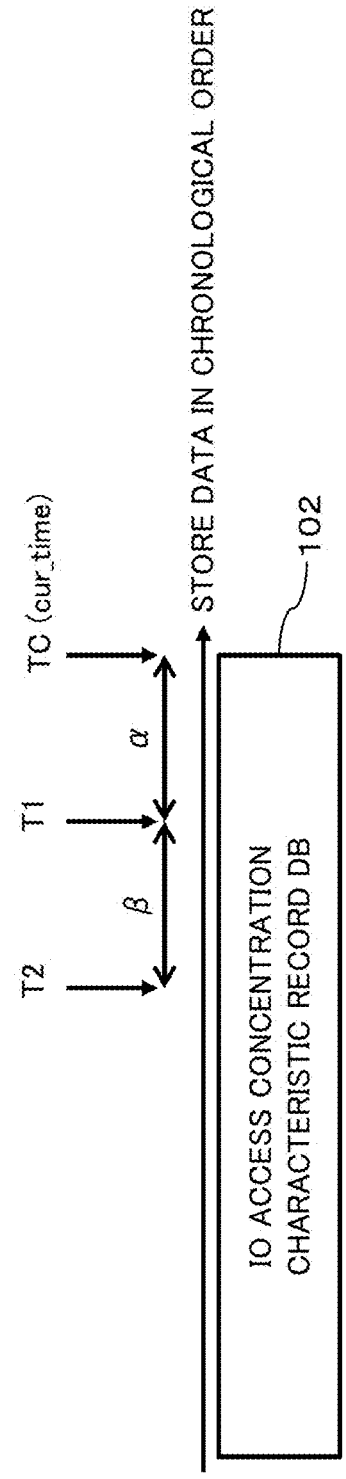
FIG. 4 is a diagram denoting a process carried out by a comparator of a tiered storage device of the first embodiment.

FIG. 4 is a diagram denoting a process performed by the comparator 103 included in the tiered storage device 1 of the first embodiment.

In FIG. 4, times T1, T2, and TC are arranged in the chronological order, and the time TC represents the current time. Consequently, the times go back to the past in the order of times TC, T1, and T2. The time period from the time T1 to the time TC is referred to as a period α, and the time period from the time T2 to the time T1 is referred to as a period β.

The time having elapsed from the time T2 to the time T1 is assumed to be the same as the time having elapsed from the time T1 to the time TC. This means that the period α has the same length as that of the period β.

When the length of the period α and the length of the period β are both represented by Tinterval, the length from the time TC to the time T2 can be represented by Tinterval×2.

Hereinafter, the time TC is sometimes referred to as cur_time. The following equations are established: the time T1=cur_time−Tinterval and the time T2=cur_time−2×Tinterval.

In relation to IO access concentrations that end during of the periods α and β, the comparator 103 calculates the maximum value of the duration time, the average value of the duration time, the minimum value of the duration time, and a RW ratio, and an average IOPS of each IO access concentration on the basis of the information obtained from, for example, the IO access concentration characteristic record DB 102. Hereinafter, the maximum value of the duration time, the average value of the duration time, the minimum value of the duration time, a RW ratio, and an average IOPS are referred to as comparison elements and these comparison elements are collectively referred to as comparison item P.

The comparator 103 compares the value (first concentration state tendency information) of each comparison element of the comparison item P of the period α and the value (second concentration state tendency information) of the corresponding comparison element of the comparison item P of the period β.

Namely, the comparator 103 compares the first concentration state tendency information collected during a first period (α) from the time (TC) of starting the determination to the first timing (T1) before a predetermined time interval (Tinterval) from the time (TC) of starting the determination with the second concentration state tendency information collected during a second period (β) from the first timing (T1) to the second timing (T2) before a predetermined time interval (Tinterval) from the first timing (T1).

In a case where at least one of the comparison elements is detected to vary by an extent more than a predetermined threshold as a result of the comparison, the comparator 103 notifies the remaining duration time table generator 104 of the detection of a change in IO access concentration tendency (IO access concentration tendency variation notification).

For example, in cases where at least one of the above comparison elements has a difference exceeding a predetermined threshold percent, the comparator 103 determines that the IO access concentration tendency has varied.

The comparator 103 confirms whether the IO access concentration tendency has varied by comparing information (comparison item P) related to IO access concentrations before and after the time Tinterval elapses each time a predetermined time, i.e., Tinterval, has elapsed, which means at intervals of the Tinterval.

The remaining duration time table generator 104 generates and updates a remaining duration time table 1041.

(a) method for generating the remaining duration time table 1041

FIG. 5 is a diagram illustrating an example of the remaining duration time table 1041 of the tiered storage device 1 of the first embodiment.

The remaining duration time table 1041 indicates an index of a remaining time (remaining duration time) left until the IO access concentration being occurring ends.

As illustrated in FIG. 5, the remaining duration time table 1041 associates a duration time, an average duration time, and a remaining duration time with one another.

A duration time represents an elapse time that has elapsed since the IO access concentration occurred. Hereinafter, a duration time is indicated by a symbol (A). For example, the duration time (A)=840 in FIG. 5 means that 840 seconds have elapsed since the IO access concentration occurred.

An average duration time represents an average value of a time from the occurrence of an IO access concentration that continues for the duration time (A) to the end of the IO access concentration. Hereinafter, an average duration time is indicated by a symbol (D). For example, an average duration time (D) ((D)=870.0) is associated with the duration time (A)=840 in FIG. 5. This means that the IO access concentration continues that has continued for 840 seconds continues for 870 seconds at average and ends when 870 seconds has elapsed.

A remaining duration time represents a remaining time until the IO access concentration being occurring ends. Hereinafter, the remaining duration time is indicated by a symbol (D). For example, the remaining duration time (E)=30.00 is associated with the duration time (A)=840 in FIG. 5. This means that the IO access concentration having continued for 840 seconds will ends 30 seconds later.

The fields of "sampling number (B)" and "C=A*B" in FIG. 5 are values to be used in the course of generating the remaining duration time table 1041. Here, the sign "*" represents multiplication (×).

Figure 6:
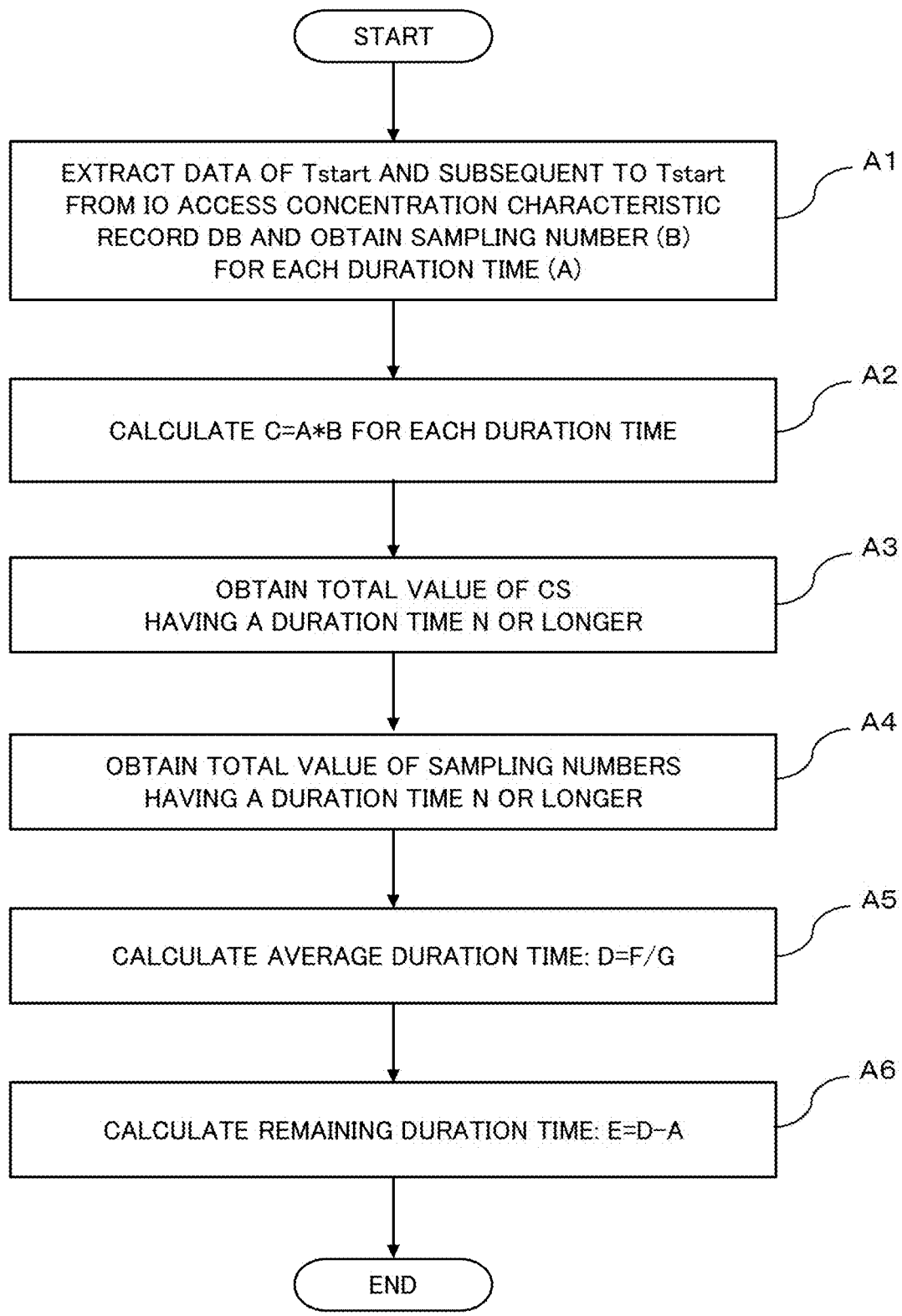
FIG. 6 is a flow diagram denoting a method for generating a remaining duration time table in a tired storage device of the first embodiment.

Description will now be made in relation to a method for generating the remaining duration time table 1041 by the remaining duration time table generator 104 in the tiered storage device 1 of the first embodiment with reference to a flow diagram FIG. 6 (steps A1-A6).

The term "Tstart" is a start time used in generating the remaining duration time table 1041. The remaining duration time table generator 104 extracts information of one or more IO access concentrations during a period (time period for generating remaining duration time table) from the time Tstart to the current time TC from the IO access concentration characteristic record DB 102, and generates the remaining duration time table 1041 using the extracted information.

The remaining duration time table generator 104 generates the remaining duration time table 1041 through carrying out the following process on each value (entry) of the duration time (A).

Hereinafter, an entry of the duration time (A) is represented by a symbol A. An arbitrary entry to be processed during the duration time (A) may be represented by a symbol N.

In step A1, the remaining duration time table generator 104 extracts data at and subsequent to Tstart and obtains a sampling number (B) for each entry of the duration time (A), using the extracted data.

In the example of FIG. 5, the entry having a duration time (A) of 840 (A=840) has a sampling number (B) of 20 (B=20).

In step A2, the remaining duration time table generator 104 multiplies the duration time (A) by the associated sampling number (B) to calculate the value C (C=A×B) for each duration time.

In the example of FIG. 5, since the entry having a duration time (A) of 840 (A=840) has a sampling number (B) of 20 (B=20), the value C=840×20=16,800.

In step A3, the remaining duration time table generator 104 calculates the total value (F) of the values (C) of the duration times (A) of N or more to be processed.

In the example of FIG. 5, in relation to the entry having values of the duration time (A) is 840 (A=840), the duration times of this duration (A) or more are 840 and 900. The total value (F) of the respective C values (C=16800, 18000) of these duration time (A=840, 900) is calculated to be the total value (F)=16800+18000=34800.

In step A4, the remaining duration time table generator 104 calculates the total value (G) of the respective sampling number (B) of the duration times (A) of N or more to be processed.

In the example of FIG. 5, since, in relation to the entry having values of the duration time (A) is 840 (A=840), the duration times of this duration (A) or more are 840 and 900, the total value (G) of the respective sampling numbers (B) of these duration time (A=840, 900) is calculated to be the total value (G)=20+20=40.

In step A5, the remaining duration time table generator 104 calculates the average duration time (D) of the IO access concentration by dividing the total value (F) of the values C calculated in step A3 by the total number (G) of the sampling numbers (B) calculated in step A4.

In the example of FIG. 5, in relation to the entry having values of the duration time (A) is 840 (A=840), the average duration time (D) is calculated to be the average duration time (D)=total value (F) of Cs/total value (G) of sampling numbers (B)=34800/40=870.

In step A6, the remaining duration time table generator 104 calculates the remaining duration time (E) of the IO access concentration by subtracting the duration time (A) from the average duration time (D) of the IO access concentration calculated in step A5.

In the example of FIG. 5, the entry having values of the duration time (A) of 840 (A=840) has the remaining duration time (E)=average duration time (D)-duration time (A)=870-840=30.

(b) change the time period for generating remaining duration time table:

Upon receipt of notification (IO access concentration tendency variation notification) indicating that a variation in IO access concentration tendency is detected from the comparator 103, the remaining duration time table generator 104 changes the data range in the IO access concentration characteristic record DB 102 which data range is to be used for generating the remaining duration time table 1041.

In other words, in cases where the comparator 103 detects a variation in an IO access concentration tendency, the remaining duration time table generator 104 sets the time T1 as the detection to Tstart. The remaining duration time table generator 104 extracts the information about the IO access concentration of the time period for generating the remaining duration time table starting from the changed time Tstart from the IO access concentration characteristic record DB 102, and generates the remaining duration time table 1041 using the extracted information.

Figure 7:
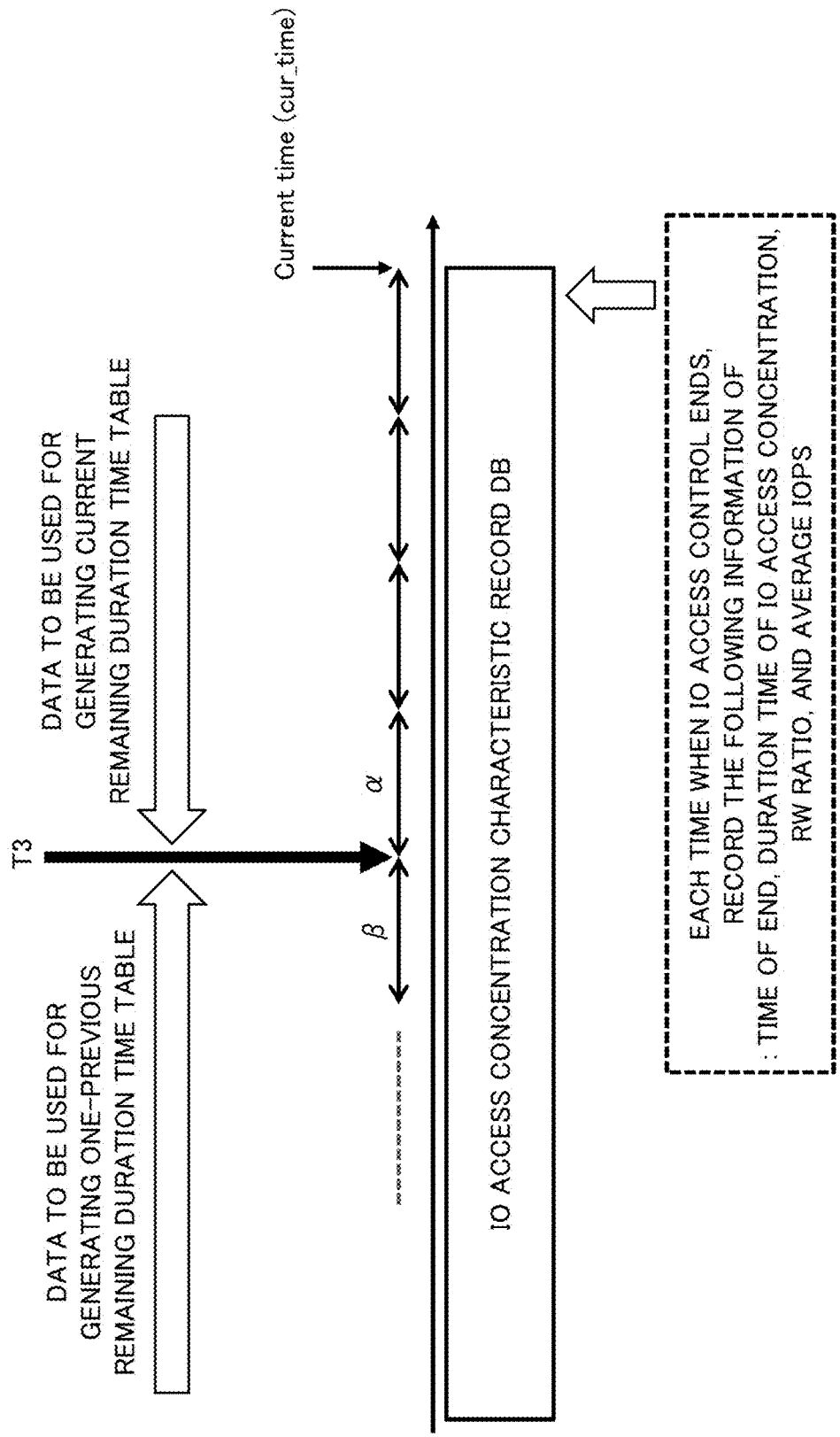
FIG. 7 is a diagram denoting a method for changing a time period for generating a remaining duration time table in a tired storage device of the first embodiment.

FIG. 7 is a diagram illustrating a method for changing the time period for generating the remaining duration time table by the remaining duration time table generator 104 of the tiered storage device 1 of the first embodiment.

The example of FIG. 7 indicates that a variation in the IO access concentration tendency is detected at the time T3.

In FIG. 7, the period antecedent to the time T3 corresponds to the period β of FIG. 4 and the period at and subsequent to the time T3 corresponds to the period α of FIG. 4.

The remaining duration time table generator 104 sets the time T3 to be Tstart. This sets a period from the time Tstart (T3) to the time TC (current time) to be the new period (period α) for generating the remaining duration time table. From the time period for generating the remaining duration time table, the information about the IO access concentration as the time T3 and antecedent to the time T3 before the change in the tendency of IO access concentration (period B) is excluded. The remaining duration time table generator 104 generates the remaining duration time table 1041 using information about the IO access concentration occurred during the time period for generating the remaining duration time table.

In this manner, the remaining duration time table generator 104 generates (regenerates) the remaining duration time table 1041 using the information about the IO access concentration after the IO access concentration tendency is changed. In other words, the remaining duration time table generator 104 can predict a duration time of the IO access concentration compatible with the latest tendency in the tiered storage device 1 without being affected by information about the IO access concentration before the IO access concentration tendency is varied.

The migration determiner 105 determines, with reference to the remaining duration time table 1041 that the remaining duration time table generator 104 generates (regenerates), whether data in a sub LUN (segment) on the SSD 20 is to be migrated (substituted) to the DIMM 30.

Specifically, the migration determiner 105 evaluates prospective data migration by comparing the overhead (loss, demerit) resulting from data migration from the SSD 20 to the DIMM 30 with the benefit (merit) obtained by the data migration. In a case where the evaluation (comparison) determines that the benefit of the data migration from the SSD 20 to the DIMM 30 exceeds the overhead of the data migration, the migration determiner 105 notifies the migration director 11c (migration determination notification).

Figure 8:
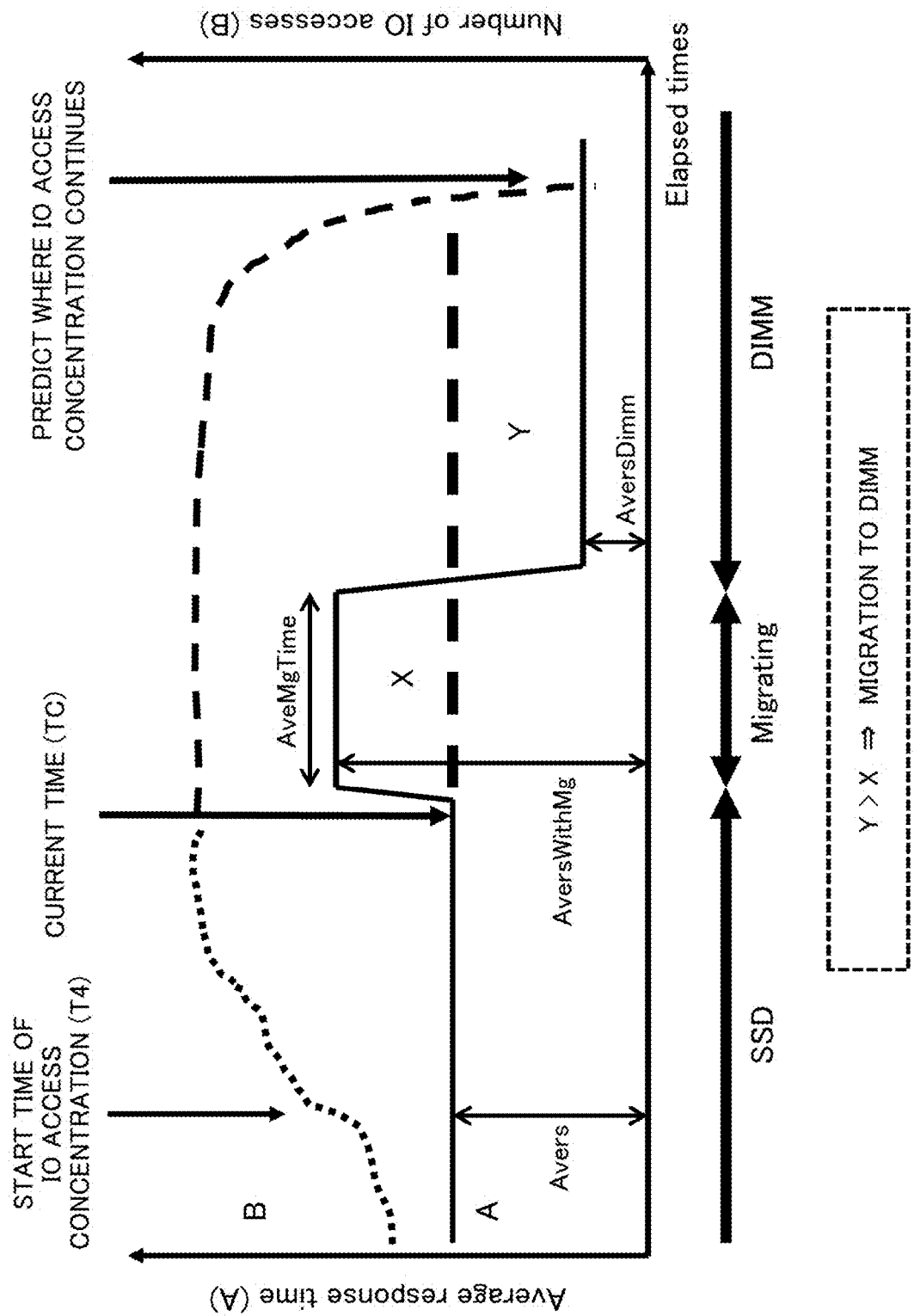
FIG. 8 is a diagram denoting a method for determining migration by a migration determiner of a tired storage device of the first embodiment.

FIG. 8 is a diagram illustrating a method for determining migration by the migration determiner 105 of the tiered storage device 1 of the first embodiment.

In FIG. 8, the overhead of prospective data migration from the SSD 20 to the DIMM 30 is represented by the symbol X and the merit obtained from the data migration is represented by the symbol Y.

Since the operation workload changes as time passes, the data collector 11a preferably always updates the above parameters. Since the performance that can be drawn from the SSD 20 gradually worsens in particular workload having much random writing, it is preferable that the data collector 11a always updates the above parameters.

The graph of FIG. 8 depicts the average response time and the number of IO accesses in each step of data migration from the SSD 20 to the DIMM 30. In FIG. 8, the ordinate represents an average response time (A) and the number of IO accesses (B), and the abscissa represents the elapse time.

As illustrated in FIG. 8, the number of IO accesses to the SSD 20 increases and then an IO access concentration is detected at the time T4. In order to deal with this IO access concentration, the data in the sub LUN of the SSD 20 on which sub LUN IO accesses concentrate is migrated to the DIMM 30.

During the migration processing, the average response time becomes longer (see the reference symbol X in FIG. 8), and after completion of the migration, i.e., after the data is migrated from the sub LUN to the DIMM 30, the average response time becomes shorter (see the reference symbol Y in FIG. 8).

The region indicated by the symbol X in FIG. 8 corresponds to the overhead to be caused by prospective data migration from the SSD 20 to the DIMM 30, so that the X region having a large area means that the overhead is large. In contrast, the region indicated by the symbol Y in FIG. 8 corresponds to the effects obtained by the data migration, so that the Y region having a large area means that the gain (benefit) obtained by the data migration is large.

The migration determiner 105 obtains the overhead X using the following equations (1) and (2).

$$Xduration = AveMgTime*(End\ sub\text{-}LUN - Start\ sub\text{-}LUN) \quad (1)$$

$$X = (AversWithMg - Avers)*Xduration \quad (2)$$

The "start sub-LUN" is the information that specifies the sub LUN that is the starting point of the IO access concentration region, and the "End sub-LUN" is information that specifies the sub LUN that is the endpoint of the IO access concentration region (see FIG. 3). Accordingly, the term (End sub-LUN−Start sub-LUN) represents the number of regions (the magnitude of regions) in which IO access concentration is occurring. The term "Xduration" represents the time required to migrate data in multiple sub LUNs in which IO access concentration is occurring. The symbol X represents the temporal disadvantage resulting from the migration.

Furthermore, the migration determiner 105 calculates the gain Y using the following equations (3) and (4).

$$Yduration = Pduration - Xduration \quad (3)$$

$$Y = (Avers - AversDimm)*Yduration \quad (4)$$

The term "Pduration" represents the remaining duration time of the IO access concentration and can be obtained by referring to the remaining duration time table 1041. The symbol Y represents temporal gain (benefit) that can be obtained (saved) by not carrying out migration.

The migration determiner 105 compares the overhead X and the gain Y and when the gain Y is larger than the overhead (Y>X), the migration determiner 105 determines that the data in the sub LUN of the SSD 20 is to be migrated to the DIMM 30, in other words, that the migration would be better carried out.

In cases where determining that migration from the SSD 20 to the DIMM 30 does not need to be carried out, the migration determiner 105 notifies the result of the determination to the migration director 11c. This notification includes, as migration target information, the information to specify the sub LUN to be migrated.

(c) predicting of an IO access concentration region:

The migration determiner 105 further has a function of predicting a region of the SSD 20 in which region an IO access concentration occurs. In other words, the migration determiner 105 functions as a predictor that predicts a position of the SSD 20 at which position an IO access concentration occurs.

Figure 9:
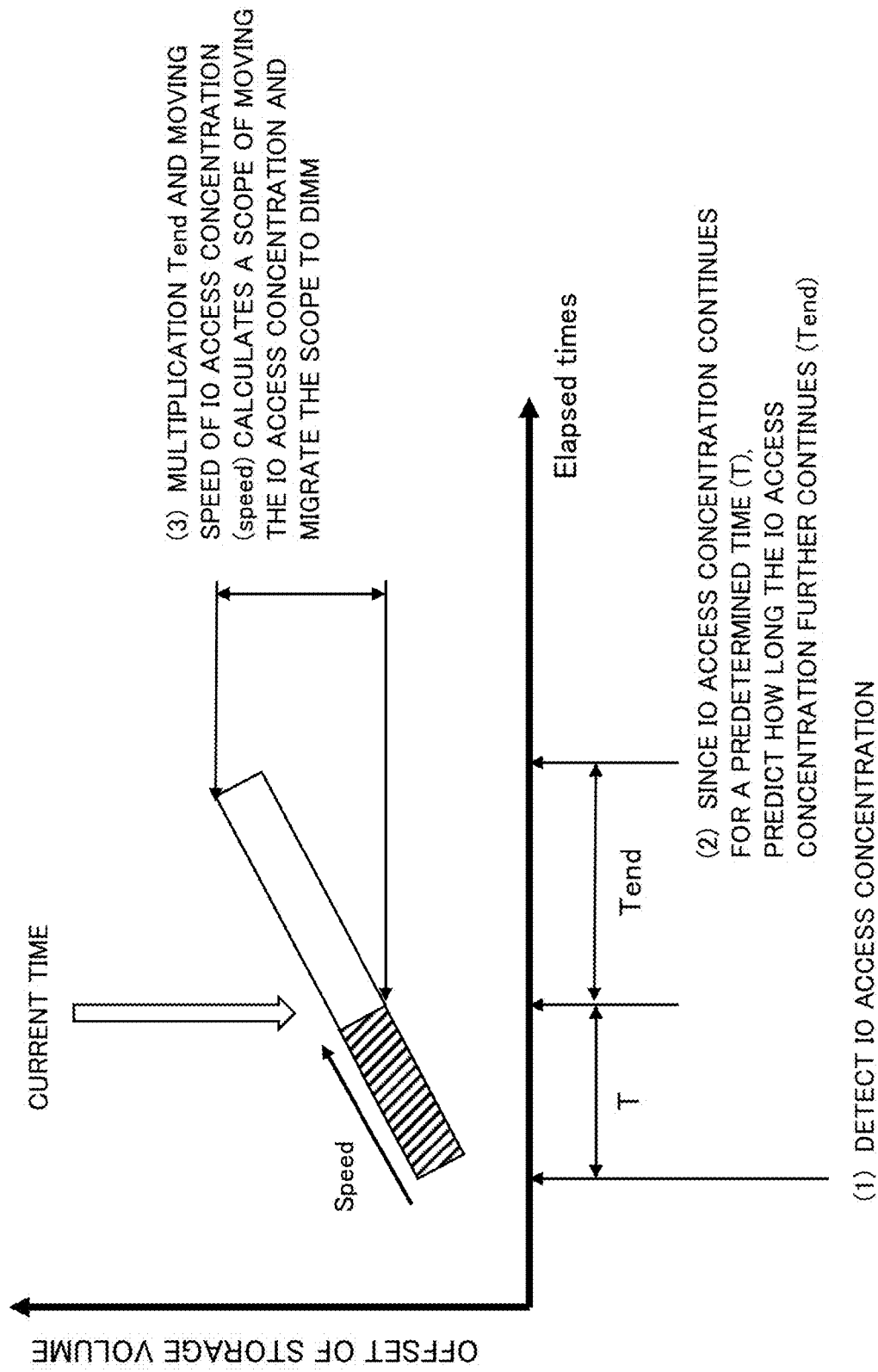
FIG. 9 is a diagram illustrating a method for predicting a region at which an IO access concentration occurs by a migration determiner in a tired storage device of the first embodiment.

FIGS. 9 and 10 are diagrams denoting a method for predicting a region at which an IO access concentration occurs by the migration determiner 105 of the tiered storage device 1 of the first embodiment.

In FIG. 9, the ordinate represents the offset of the storage volume, and the abscissa represents the elapse time. In FIG. 9, the white rectangular represents a region (predicted IO access concentration region) at which an IO access concentration is predicted to occur, and the hatched rectangular represents a region at which an IO access concentration has actually occurred.

FIG. 9 depicts a state when the time T has elapsed (current time=T) since the IO access concentration was detected. The migration determiner 105 obtains the remaining duration time with reference to the remaining duration time table 1041 and predicts how long the IO access concentration will further continue.

In FIG. 9, at the current time, a predetermined time (T) has elapsed since the IO access concentration occurred. The migration determiner 105 refers to the duration time (A) in the remaining duration time table 1041 on the basis of the elapse time T, and obtains the remaining duration time (E) associated with the duration time (A). The obtained remaining duration time is regarded as Tend. In other words, the migration determiner 105 refers to the duration time (A) in the remaining duration time table 1041 on the basis of the elapsed time T and thereby predicts the remaining duration time Tend.

On the basis of two or more positions at which IO access concentrations occur and the times of occurrence of these IO access concentrations, the migration determiner 105 calculates the speed (Speed) of movement of occurrence position of an IO access concentration. In addition to the above, the migration determiner 105 may specify the direction of movement of occurrence position of an IO access concentration on the basis of two or more positions at which IO access concentrations occur and the times of occurrence of these IO access concentrations.

The migration determiner 105 obtains the predicted IO access concentration region (region of white rectangular in FIG. 9) by multiplying the remaining duration time Tend by the speed (Speed) of movement of occurrence position of an IO access concentration. Alternatively, the migration determiner 105 may obtain the predicted IO access concentration region using the direction of movement of the occurrence position of an IO access concentration.

The migration determiner 105 notifies the migration director 11c of the predicted IO access concentration region predicted as the migration target information.

Upon receipt of the migration determination notification and the migration target information from the migration determiner 105, the migration director 11c, which will be detailed below, instructs the tier driver 12 to migrate data in the selected sub LUN from the SSD 20 to the DIMM 30 in obedience to the instruction from the migration determiner 105.

Specifically, the data stored in the sub LUN included in the predicted IO access concentration region of the SSD 20 which region is predicted by the migration determiner 105 is included in the target to be migrated to the DIMM 30.

Consequently, the data in the predicted IO access concentration region of the SSD 20 which region is predicted by the migration determiner 105 is migrated to the DIMM 30.

FIG. 10 indicates a state where a time T2 has elapsed (current time=T2) since the IO access concentration was detected after the state of FIG. 9.

The migration determiner 105 predicts the remaining duration time T2end by referring to the duration time (A) of the remaining duration time table 1041 on the basis of the elapsed time T2.

Then the migration determiner 105 obtains a new predicted IO access concentration region (white rectangular in FIG. 10) based on the duration time T2end newly predicted.

The migration determiner 105 notifies the migration director 11c of a region obtained by excluding the part that has already migrated to the DIMM 30 by the migration director 11c from the predicted IO access concentration region predicted as the migration target information. Consequently, the data in the predicted IO access concentration region in the SSD 20 predicted by the migration determiner 105 is migrated to the DIMM 30.

Figure 11B:
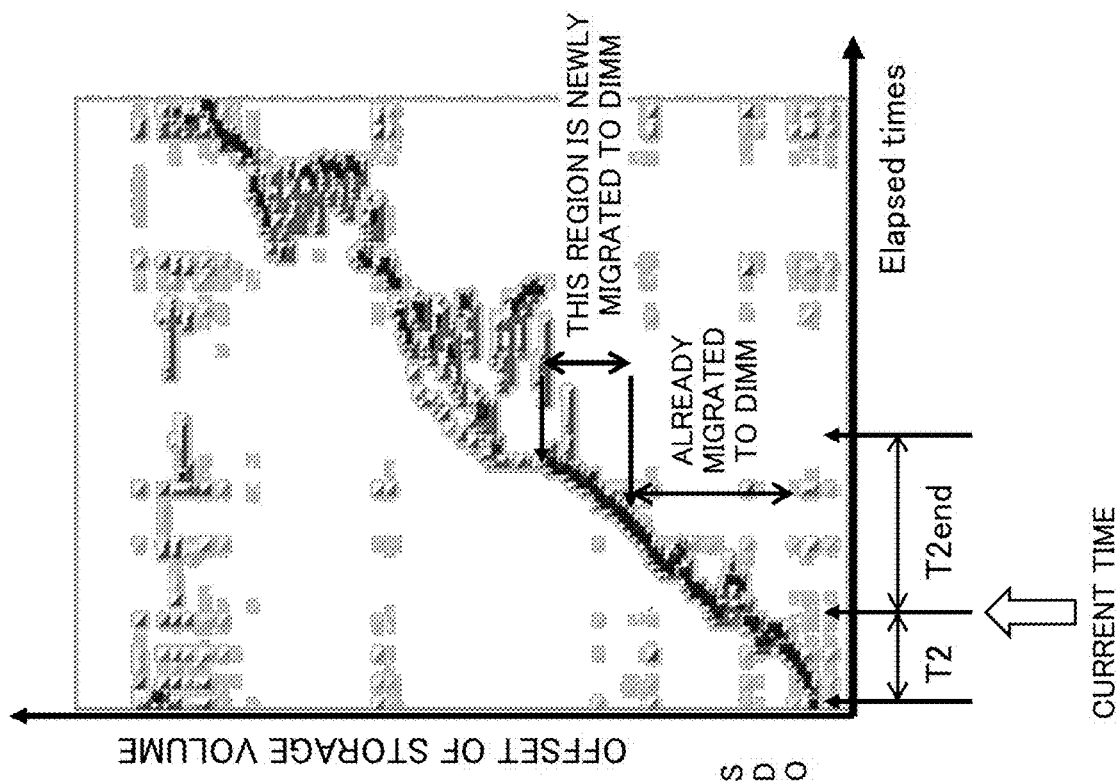
FIGS. 11A and 11B are diagrams each illustrating a predicted IO access concentration region along with a workload footprint.
Figure 11A:
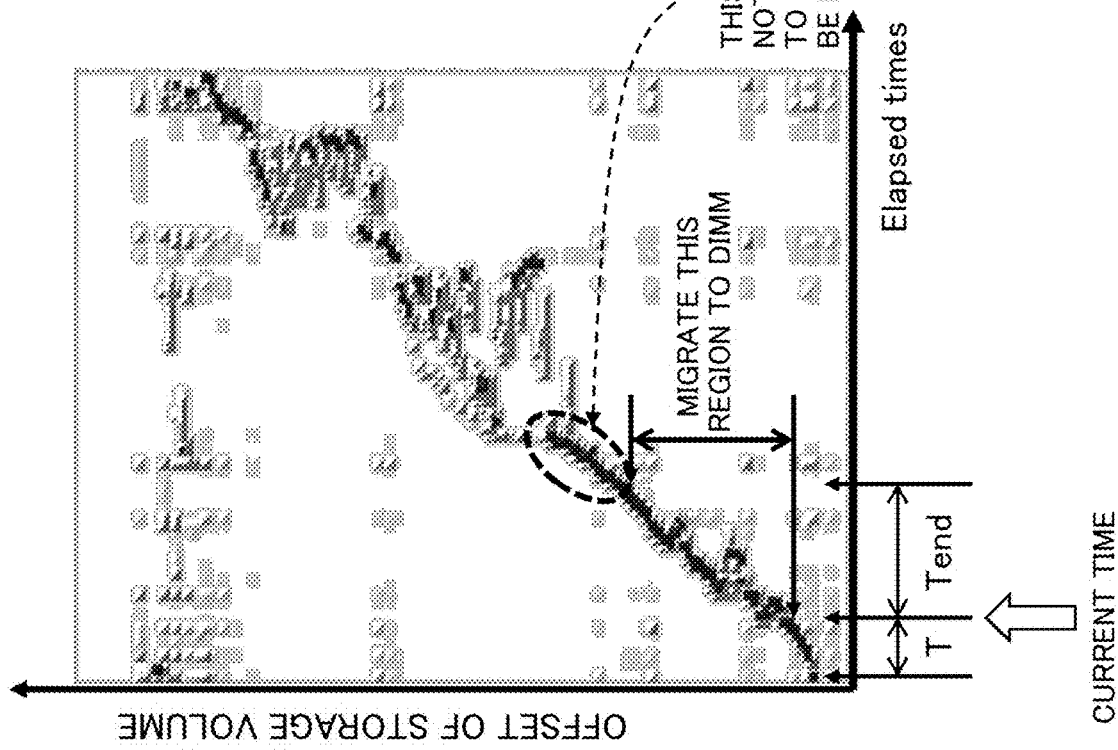

FIGS. 11A and 11B are diagrams illustrating a predicted IO access concentration region along with a workload footprint. FIG. 11A represents the state at the time point (current time=T) when a time T has elapsed since an IO access concentration was detected, and FIG. 11B represents the state where the time point (current time=2T) when a time 2T has elapsed since the predicted IO access concentration was detected.

A region which is not included in the range of the predicted IO access concentration region (migration target information) obtained through IO access concentration prediction made at the time T as depicted in FIG. 11A is newly incorporated in the predicted IO access concentration region (migration target information) by IO access concentration prediction made at the time 2T as illustrated in FIG. 11B.

Referring back to FIG. 2, the migration director 11c instructs the tier driver 12 to migrate the data in a selected sub LUN from the SSD 20 to the DIMM 30 or from the DIMM 30 to the SSD 20 in obedience to the instruction from the migration determiner 105.

The tier driver 12 distributes an IO request that the user makes for a storage volume to the SSD driver 13 or the HDD driver 14, and returns an IO response from the SSD driver 13 or the HDD driver 14 to the user.

Upon receipt of a sub LUN migration instruction (segment migration instruction) from the migration director 11c, the tier driver 12 carries out a migration process that migrates data stored in the unit region to be migrated in the DIMM 30 or the SSD 20 to the SSD 20 or the DIMM 30.

The data migration between the SSD 20 and the DIMM 30 carried out by the tier driver 12 can be achieved by any known method and the detailed description is omitted here.

The SSD driver 13 controls an access to the SSD 20 on the basis of an instruction from the tier driver 12. The DIMM driver 14 controls an access to the DIMM 30 on the basis of an instruction from the tier driver 12.

Figure 12:
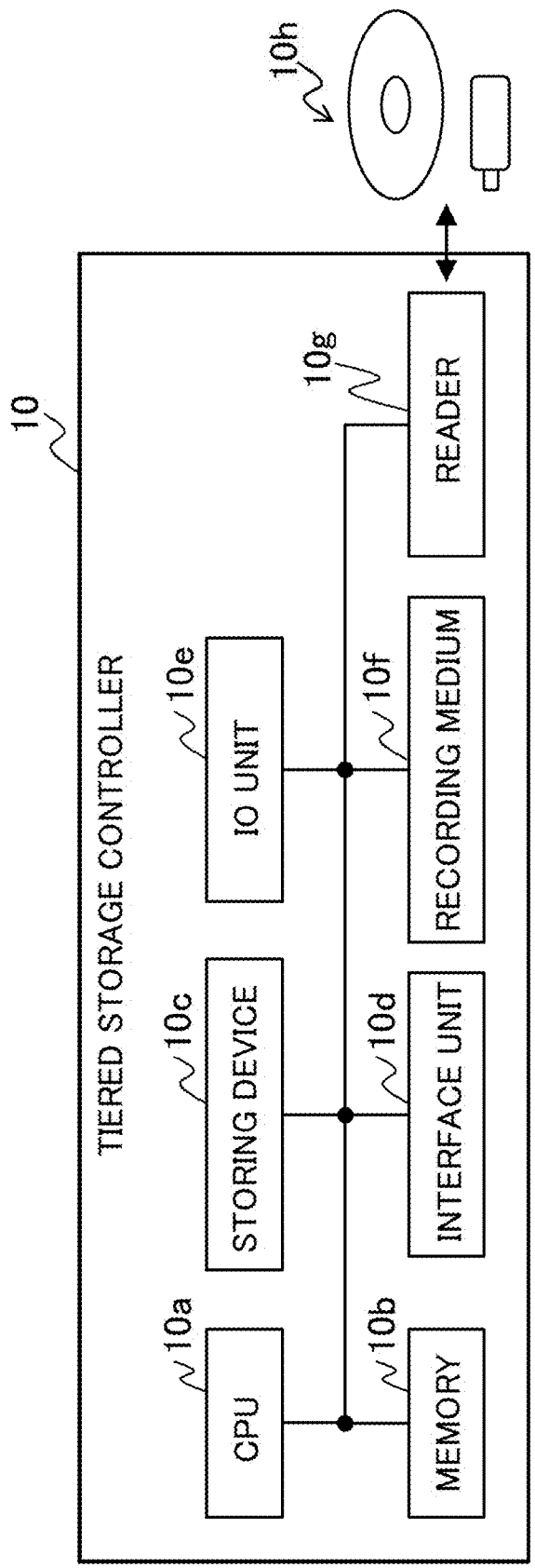
FIG. 12 is a diagram illustrating an example of a hardware configuration of a tired storage controller in a tired storage device of the first embodiment.

(1-3) Example of the Hardware Configuration of the Tired Storage Controller:

Next, description will now be made in relation to the hardware configuration of the tired storage controller 10 illustrated in FIG. 2 with reference to FIG. 12. FIG. 12 is a diagram illustrating an example of the hardware configuration of the tired storage controller 10 included in the tiered storage device 1 of the first embodiment.

As illustrated in FIG. 12, the tired storage controller 10 includes a CPU 10a, a memory 10b, a storing device 10c, an interface unit 10d, an IO unit 10e, a recording medium 10f, and a reader 10g.

The CPU 10a is connected to each of the elements 10b-10g and functions as an arithmetic operator (processor) that carries out various controls and calculations. The CPU 10a achieves various functions of the tired storage controller 10 by executing a program stored in, for example, the memory 10b, the storing device 10c, the recording media 10f and 10h, and a non-illustrated Read Only Memory (ROM).

The memory 10b is a storing device that stores various pieces of data and programs. The CPU 10a stores and expands data and a program into and on the memory 10b when executing the program. An example of memory 10b is a volatile memory such as Random Access Memory (RAM).

The storing device 10c is a hardware device that stores, for example, various pieces of data and programs. Examples of the storing device 10c includes a magnetic disk device such as a HDD, a semiconductor drive device such as an SSD, a non-volatile memory such as a flash memory. The storing device 10c may consist of multiple devices, which may constitute Redundant Arrays of Inexpensive Disks (RAID). The storing device 10c may be a Storage Class Memory (SCM), and alternatively may include the SSD 20 and/or the DIMM 30 illustrated in FIG. 2.

The interface unit 10d wiredly or wirelessly controls connection and communication with a network (not illustrated) and another information processing apparatus. Examples of interface unit 10d include adaptors confirming to a Local Area Network (LAN), a Fiber Channel (FC), and an InfiniBand.

The IO unit 10e can include at least one of an input device such as a mouse and a keyboard and an output device such as a display and a printer. For example, the IO unit 10e is used for various operations made by the user or the administrator of the tired storage controller 10.

The recording medium 10f is a storing device such as a flash memory and a ROM, and is capable of storing various pieces of data and programs. The reader 10g is a device that reads data and programs stored in a computer-readable recording medium 10h. At least one of the recording medium 10f and 10h may store a control program that achieves all or part of the functions of the tired storage controller 10 of the first embodiment. For example, the CPU 10a expands a program read from the recording medium 10f or a program read from the recording medium 10h via the reader 10g on a storing device such as the memory 10b and executes the expanded program. Thereby, the computer (including the CPU 10a, the information processing apparatus, various terminals) can achieve the above functions of the tired storage controller 10.

Examples of the recording medium 10h are a flexible disk; an optical disk such as a Compact Disk (CD), a Digital Versatile Disc (DVD), and a Blu-ray disk; and a flash memory such as a Universal Serial Bus (USB) memory and an SD card. Examples of a CD include CD-ROM, CD-Recordable (CD-R), and a CD-Rewritable (CD-RW). Examples of a DVD are DVD-ROM, DVD-RAM, DVD-R, DVD-RW, DVD+R, and DVD+RW.

The elements 10a-10g are communicably connected to one another via buses. For example, the CPU 10a is connected to the storing device 10c via a disk interface. The hardware configuration of the tired storage controller 10 described above is an example, so increase or decrease of hardware devices (addition or omission of any device), division, integration of any devices of a hardware device and addition and omission of the bus may be arbitrary carried out.

Figure 13:
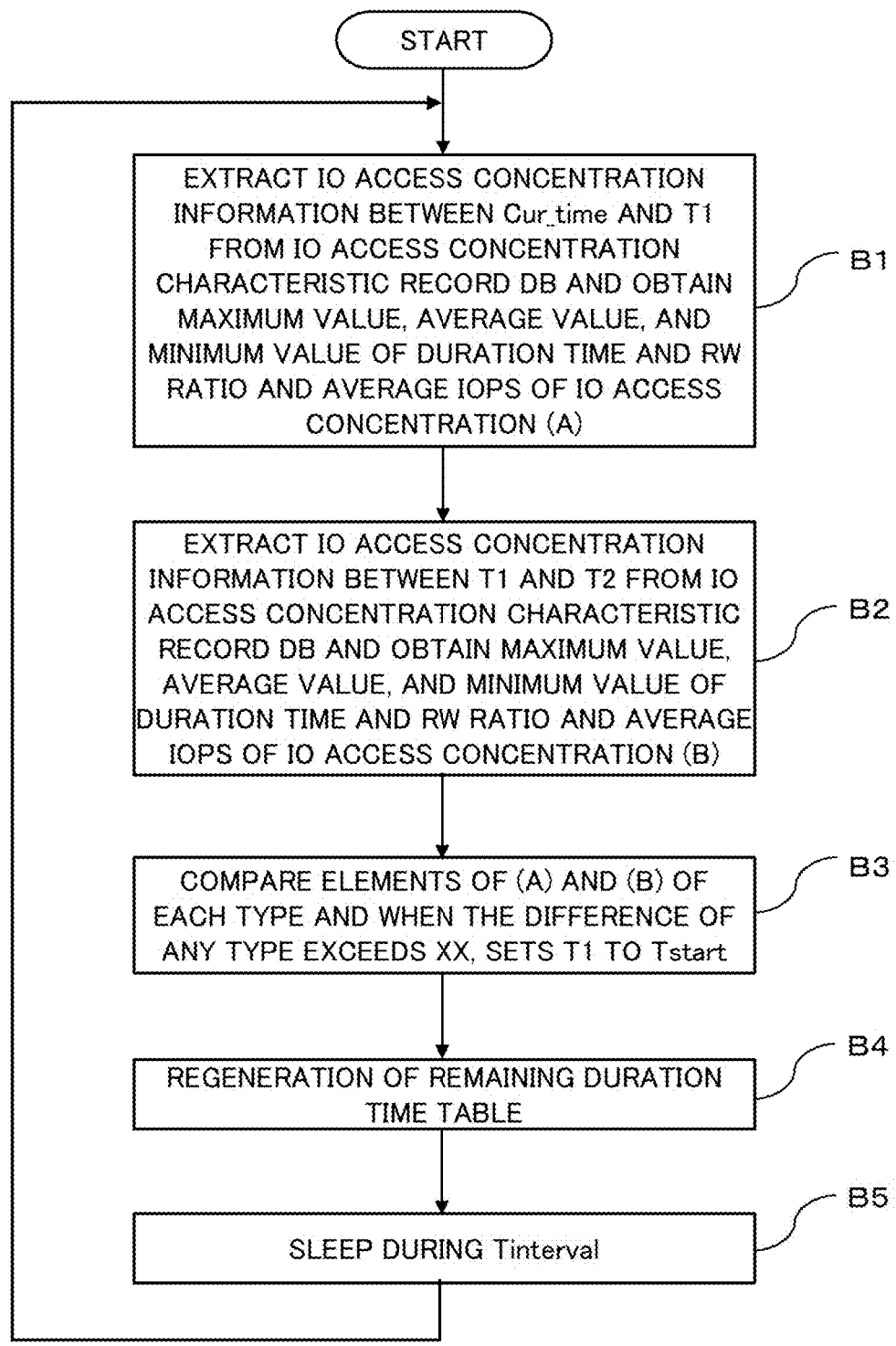
FIG. 13 is a flow diagram illustrating a method for updating a start time Tstart in a tired storage device of the first embodiment.

(2) Operation:

First of all, description will now be made in relation to a method of updating the start time Tstart of the tiered storage device 1 of the first embodiment having the configuration described above with reference to a flow diagram (steps B1-B5) of FIG. 13.

In step B1, the remaining duration time table generator 104 extracts information about one or more IO access concentrations that occurred from the current time TC to the time T1 from the IO access concentration characteristic record DB 102.

Then the remaining duration time table generator 104 calculates the maximum value, the average value, the minimum value of the duration time, a RW ratio, and the average IOPS of one or more IO access concentrations extracted. Hereinafter, the maximum value, the average value, the minimum value of the duration time, a RW ratio, and the average IOPS are collectively referred to as IO access concentration tendency information (A).

In step B2, the remaining duration time table generator 104 extracts information about one or more IO access concentrations that occurred during the current time T1 to the time T2 from the IO access concentration characteristic record DB 102.

Then the remaining duration time table generator 104 calculates the maximum value, the average value, the minimum value of the duration time, a RW ratio, and the average IOPS of one or more IO access concentrations extracted. Hereinafter, the maximum value, the average value, the minimum value of the duration time, a RW ratio, and the average IOPS are collectively referred to as IO access concentration tendency information (B).

In step B3, the comparator 103 compares the value of each element (comparison element) of the IO access concentration tendency information (A) with the value of the corresponding element of the IO access concentration tendency information (B). As a result of the comparison, in cases where at least one of the elements has a difference exceeding the predetermined threshold percent, the comparator 103 notifies the remaining duration time table generator 104 of the detection of variation in the IO access concentration tendency (IO access concentration tendency variation notification).

Upon receipt of the IO access concentration tendency variation notification that indicates that a variation in the IO access concentration tendency is detected from the comparator 103, the remaining duration time table generator 104 changes the data range in the IO access concentration characteristic record DB 102 which data range is to be used for generating the remaining duration time table 1041. Specifically, the remaining duration time table generator 104 sets the time T1 at this point to Tstart.

In step B4, the remaining duration time table generator 104 extracts information about one or more IO access concentrations during the time period for generating the remaining duration time table starting from the changed start time Tstart from the IO access concentration characteristic record DB 102, and generates (regenerates) the remaining duration time table 1041 using the extracted information.

After that, the process sleeps for the time Tinterval in step B5 and returns to step B1.

Figure 14:
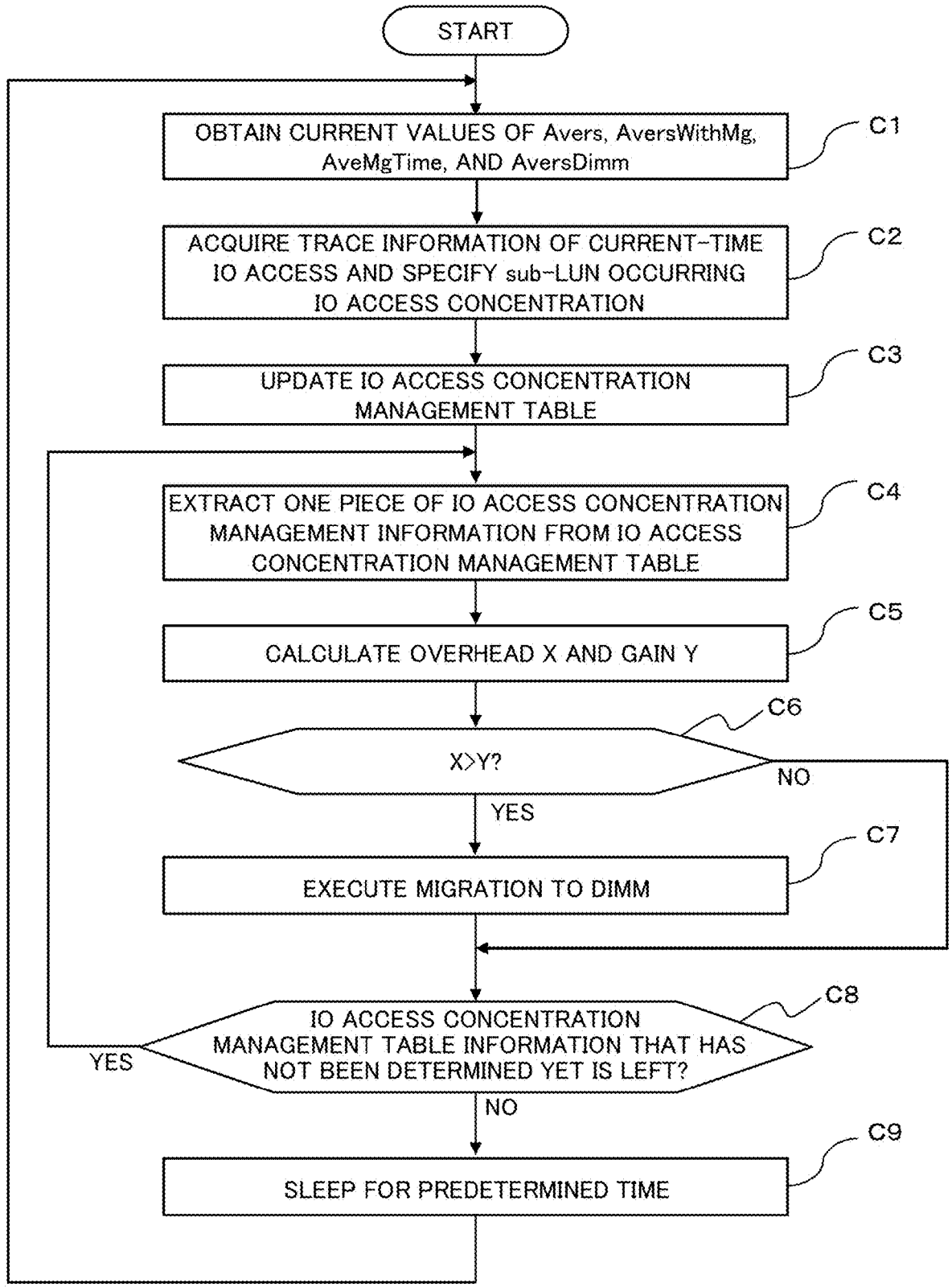
FIG. 14 is a flow diagram illustrating a process carried out by a workload analyzer in a tired storage device of the first embodiment.

Next, description will now be made in relation to a process performed by the workload analyzer 11b in the tiered storage device 1 of the first embodiment with reference to the flow diagram (steps C1-C9) of FIG. 14.

In step C1, the workload analyzer 11b obtains the current values of Avers, AversWithMg, AveMgTime, and AversDimm of the average response times from the tier driver 12 via the data collector 11a.

In step C2, the monitor 101 obtains the trace information of the current IO accesses from the data collector 11a and determines whether an IO access concentration is occurring. In cases where the IO access concentration is occurring, the monitor 101 specifies the sub LUN at which the IO access concentration is occurring.

In step C3, the monitor 101 updates the IO access concentration characteristic record DB 102 (IO access concentration management table).

For example, the monitor 101 compares the sub LUN at which the IO access concentration is occurring specified in step C2 with each of the entries from the Start sub-LUN to the End sub-LUN registered in the IO access concentration management table.

As a result of the comparison, in a case where the sub LUN at which the IO access concentration is occurring specified in step C2 is registered in the IO access concentration management table, the corresponding entry in IO access concentration management table is maintained. In contrast, in a case where the sub LUN at which the IO access concentration is occurring specified in step C2 is not registered in the IO access concentration management table, the sub LUN at which the IO access concentration is occurring is newly registered into the IO access concentration management table.

In a cases where an IO access concentration already registered in the IO access concentration management table is not included in the one or more IO access concentrations is occurring specified in step C2, the former IO access concentration is determined to have already ended. The tired storage controller 10 therefore deletes the information about the IO access concentration determined to have ended from the IO access concentration management table.

In step C4, the migration determiner 105 extracts, as a determination target, a single piece of IO access concentration management information registered in the IO access concentration management table. Then, in step C5, the migration determiner 105 calculates the overhead X of the IO access concentration management information extracted in step C4, using the equations (1) and (2), and calculates the gain Y using the equations (3) and (4).

In step C6, the migration determiner 105 compares the calculated overhead X with the calculated gain Y.

As a result of comparison (step C6), in cases where the overhead X is larger than the gain Y (see YES route in step C6), the process moves to step C7.

In step C7, the migration determiner 105 determines that the data in the sub LUN determined would be better to be migrated from the SSD 20 to the DIMM 30. The migration determiner 105 notifies the migration director 11c of the result of the determination, and causes the tier driver 12 to migrate the data in the sub LUN to be determined from the SSD 20 to the DIMM 30. Then, the process moves to step C8.

As a result of comparison (step C6), also in cases where the overhead X is equal to or smaller than the gain Y (see NO route in step C6), the process moves to step C8.

In step C8, the migration determiner 105 confirms whether an IO access concentration that has not been determined yet is left in the IO access concentration management table.

As a result of the confirmation, in cases where an IO access concentration that has not been determined yet is left (see YES route in step C8), the process returns to step C4.

In contrast, in cases where IO access concentration that has not been determined yet is not left (see NO route in step C8), the process waits (sleeps) until a predetermined time has elapsed and then returns to step C1.

(3) Effects:

As described above, the comparator 103 in the tiered storage device 1 of the first embodiment compares each value (the maximum value of the duration time, the average value of the duration time, the minimum value of the duration time, the RW ratio, and the average IOP) of the comparison items P of before and after the T interval elapses each time the time T interval elapses. In cases where one of the comparison items P varies more than the threshold percent, the comparator 103 notifies the remaining duration time table generator 104 of the detection of a variation in the IO access concentration tendency (IO access concentration tendency variation notification).

Upon receipt of the IO access concentration tendency variation notification, the remaining duration time table generator 104 changes the time period for generating the remaining duration time table to the time period after the IO access concentration tendency varies. Then the remaining duration time table generator 104 extracts information of the IO access concentration during the varied time period for generating the remaining duration time table from the IO access concentration characteristic record DB 102 and generates the remaining duration time table 1041 using the extracted information.

Thereby, the information about the IO access concentration before the IO access concentration tendency varies can be excluded from the remaining duration time table 1041 generated by the remaining duration time table generator 104, so that the precision of the remaining duration time table 1041 can be enhanced.

The migration determiner 105 can precisely predict the IO access concentration with reference to the precise remaining duration time table 1041. In other words, the migration determiner 105 determining whether or not the data in a sub LUN of the SSD 20 is to be migrated to the DIMM 30 with reference to the highly-precise remaining duration time table 1041 can improve the hit ratio of an IO access to the DIMM 30, so that the accessibility of the tiered storage device 1 can be improved.

The migration determiner 105 calculates the overhead X and the gain Y resulting from the respective data migration from the SSD 20 to the DIMM 30. In a case where the gain Y is larger than the overhead X as the result of comparison between the overhead X and the gain Y, the migration determiner 105 determines that the data in the sub LUN of the SSD 20 is migrated to the DIMM 30.

Accordingly, since migration of the data in a sub LUN from the SSD 20 to the DIMM 30 is carried out only when the migration is determined to bring an advantageous effect, the migration surely brings an advantageous effect.

Furthermore, the migration determiner 105 obtains the remaining duration times Tend and T2end with reference to the remaining duration time table 1041, and calculates the speed (Speed) of movement of occurrence position of an IO access concentration. Using the above information pieces, the migration determiner 105 specifies the predicted IO access concentration region.

The migration director 11c migrates the data in a sub LUN included in the predicted IO access concentration region of the SSD 20 to the DIMM 30. Consequently, it is possible to previously migrate data in a sub LUN having a high possibility of undergoing an IO access concentration and belonging to the SSD 20 to the DIMM 30. Accordingly, this improves the hit ratio of an IO access to the DIMM 30, so that the accessibility of the tiered storage device 1 can be improved.

(4) Miscellaneous:

The technique disclosed herein is not limited to the above first embodiment and can be variously modified without departing from the concept of the first embodiment.

For example, the description of the first embodiment is made in relation to the tiered storage device 1, which includes the SSD 20 and the DIMM 30. However, the object of the first embodiment is not limited to the tiered storage device 1. Alternatively, the first embodiment can be similarly applied to a tiered storage system including a cache memory and a main storage device. In other words, the first embodiment can be applied to a tiered storage device having a volatile storing device as well as to a tiered storage device having non-volatile storing devices.

The first embodiment can also be applied to a tiered storage device including storing devices having processing velocities largely different from each other as well as the tiered storage device 1 including the SSD 20 and the DIMM 30. The first embodiment may be applied to, for example, a tiered storage device including the SSD 20 and a HDD, which has a lower access speed than that of the SSD 20. Further alternatively, the first embodiment may be applied to a tiered storage device including the SSD 20 and a magnetic recording device, such as a tape drive, which is larger in capacity but slower in speed than the SSD 20.

Furthermore, the description of the behavior of the tired storage controller 10 the first embodiment is made, focusing on a single SSD 20 and a single DIMM 30. Alternatively, the first embodiment can be also applied to the tiered storage device 1 having multiple SSDs 20 and multiple DIMMs 30.

The first embodiment assumes that the tired storage controller 10 utilizes the function of, for example, Linux® device mapper, but is not limited to this. Alternatively, the tired storage controller 10 may utilize another volume management driver and the other function of the OS. Various changes and modification to the function can be suggested.

The functional blocks of the tired storage controller 10 illustrated in FIG. 2 may be combined in an arbitrary combination and divided.

In the description, the workload analyzer 11b determines a region to be migrated in a unit of a sub LUN (segment) and instructs the migration director 11c to migrate data between tires. But, the data migration is not limited to this.

Alternatively, a region that is to be migrated and that is specified by the workload analyzer 11b may be a region connecting multiple regions surrounding respective highly-loaded regions. In this case, the workload analyzer 11b may notify the migration director 11c of the segment IDs or information indicating the range of the offsetting as information of the segments to be migrated. For this migration, the migration director 11c satisfactorily instructs the tier driver 12 to migrate data in each of the multiple sub LUNs included in the notified scope.

In the first embodiment detailed above, the workload analyzer 11b has functions of the monitor 101, the IO access concentration characteristic record DB 102, the comparator 103, the remaining duration time table generator 104, and the migration determiner 105. The functions of workload analyzer 11b are not limited to the above. Alternatively, the functions of the monitor 101, the IO access concentration characteristic record DB 102, the comparator 103, the remaining duration time table generator 104, and the migration determiner 105 may be included in the tier manager 11.

In the first embodiment detailed above, the present invention is applied to a tiered storage device. However, the object of the present invention is not limited to this. The present invention is applied likewise to a tiered storage device including a first storing device being a cache memory, the first storing device being a DIMM in the description. This alternative obtains the same advantage as that of the above first embodiment.

The first embodiment can be executed and fabricated by those ordinary skilled in the art referring to the above disclosure.

According to the first embodiment, IO access concentration can be precisely predicted.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A method of controlling storage in an information processing apparatus including a storing device, the method comprising:

generating data access prediction information in relation to the storing device based on a data access history to a unit region of the storing device;

comparing first concentration state tendency information and second concentration state tendency information, the first concentration state tendency information being collected during a first time period and indicating a tendency of a concentration state of a unit region being in the concentration state on which unit region data accesses are concentrating in the storage device, the second concentration state tendency information being collected during a second time period prior to the first time period and indicating a tendency of the concentration state of the unit region in the concentration state, in a case where the first concentration state tendency information is detected to vary by a standard value or more from the second concentration state tendency information as a result of the comparing, regenerating the data access prediction information by excluding a data access history collected during the second time period, and collecting concentration state tendency information indicating a tendency of the concentration state in a unit region being in the concentration state on which unit region data accesses are concentrating at regular intervals of a predetermined time period based on a data access log of each of the plurality of unit regions of the storing device, the comparing compares the first concentration state tendency information collected during the first time period from a time of starting determination to a first timing, the first timing being before the predetermined time period from the time of starting determination and the second concentration state tendency information collected during the second time period from the first timing to a second timing which is before the predetermined time period from the first timing, and the storing device comprises a first storing device and a second storing device having a different performance from that of the first storing device, the first storing device and the second storing device serving as the storing device; and the method further comprises specifying a unit region storing data to be migrated between the first storing device and the second storing device based on the data access prediction information;

issuing an instruction to migrate data in the unit region specified by the specifier between the first storing device and the second storing device, the data access prediction information is configured to associate each of a plurality of times having elapsed since the occurrence of the concentration state with a predicted value representing a remaining duration time of the concentration state, predicting the remaining duration time of the concentration state by referring to the data access prediction information based on time elapsed since access concentration was detected, calculating speed of movement of the access concentration based on occurrence position of the access concentration and the time of the access concentration, obtaining predicted access concentration region based on the remaining duration time of the concentration state and speed of movement of the access concentration, and specifying the predicted access concentration region as the unit region to be migrated.

2. The method of controlling storage according to claim 1, further comprising comparing a loss and a gain that are resulting from prospective migration of the data between the first storing device and the second storing device and determining, in a case where the gain is larger than the loss, that the data is to be migrated.

3. The method of controlling storage according to claim 1, further comprising predicting a position of occurrence of the concentration state,
the specifying specifies the unit region included in the position of occurrence of the concentration state to be the unit region storing data to be migrated between the first storing device and the second storing device.

4. A non-transitory computer-readable recording medium having stored therein a program for controlling storage, the program instructing a computer including a storing device to execute a process comprising:
generating data access prediction information in relation to the storing device based on a data access history to a unit region of the storing device;
comparing first concentration state tendency information and second concentration state tendency information, the first concentration state tendency information being collected during a first time period and indicating a tendency of a concentration state of a unit region being in the concentration state on which unit region data accesses are concentrating in the storage device, the second concentration state tendency information being collected during a second time period prior to the first time period and indicating a tendency of the concentration state of the unit region in the concentration state,
in a case where the first concentration state tendency information is detected to vary by a standard value or more from the second concentration state tendency information as a result of the comparing, regenerating the data access prediction information by excluding a data access history collected during the second time period, and
collecting concentration state tendency information indicating a tendency of the concentration state in a unit region being in the concentration state on which unit region data accesses are concentrating at regular intervals of a predetermined time period based on a data access log of each of the plurality of unit regions of the storing device,
the comparing compares the first concentration state tendency information collected during the first time period from a time of starting determination to a first timing, the first timing being before the predetermined time period from the time of starting determination and the second concentration state tendency information collected during the second time period from the first timing to a second timing which is before the predetermined time period from the first timing, and
the storing device comprises a first storing device and a second storing device having a different performance from that of the first storing device, the first storing device and the second storing device serving as the storing device; and
the process further comprises:
specifying a unit region storing data to be migrated between the first storing device and the second storing device based on the data access prediction information;
issuing an instruction to migrate data in the unit region specified by the specifier between the first storing device and the second storing device,
the data access prediction information is configured to associate each of a plurality of times having elapsed since the occurrence of the concentration state with a predicted value representing a remaining duration time of the concentration state,
predicting the remaining duration time of the concentration state by referring to the data access prediction information based on time elapsed since access concentration was detected,
calculating speed of movement of the access concentration based on occurrence position of the access concentration and the time of the access concentration,
obtaining predicted access concentration region based on the remaining duration time of the concentration state and speed of movement of the access concentration, and
specifying the predicted access concentration region as the unit region to be migrated.

5. The non-transitory computer-readable recording medium according to claim 4, the process further comprising comparing a loss and a gain that are resulting from prospective migration of the data between the first storing device and the second storing device and determining, in a case where the gain is larger than the loss, that the data is to be migrated.

6. The non-transitory computer-readable recording medium according to claim 4, wherein
the process further comprises a predictor that predicts a position of occurrence of the concentration state; and
the specifying specifies the unit region included in the position of occurrence of the concentration state to be the unit region storing data to be migrated between the first storing device and the second storing device.

7. An information processing apparatus comprising:
a storing device;
a generator is configured to generate data access prediction information in relation to the storing device based on a data access history to a unit region of the storing device;
a comparator is configured to compare first concentration state tendency information and second concentration state tendency information, the first concentration state tendency information being collected during a first time period and indicating a tendency of a concentration state of a unit region being in the concentration state on which unit region data accesses are concentrating in the storage device, the second concentration state tendency information being collected during a second time period prior to the first time period and indicating a tendency of the concentration state of the unit region in the concentration state, and
in a case where the first concentration state tendency information is detected to vary by a standard value or more from the second concentration state tendency information as a result of the comparing by the comparator, the generator regenerates the data access prediction information by excluding a data access history collected during the second time period,
the information processing apparatus further comprising a collector is configured to collect concentration state tendency information indicating a tendency of the concentration state in a unit region being in the concentration state on which unit region data accesses are concentrating at regular intervals of a predetermined time period based on a data access log of each of the plurality of unit regions of the storing device,
the comparator compares the first concentration state tendency information collected during the first time period from a time of starting determination to a first timing, the first timing being before the predetermined time period from the time of starting determination and the second concentration state tendency information collected during the second time period from the first timing to a second timing which is before the predetermined time period from the first timing, the information processing apparatus further comprising:

a first storing device and a second storing device having a different performance from that of the first storing device, the first storing device and the second storing device serving as the storing device;

a specifier is configured to specify a unit region storing data to be migrated between the first storing device and the second storing device based on the data access prediction information; and a migration director is configured to issue an instruction to migrate data in the unit region specified by the specifier between the first storing device and the second storing device, the data access prediction information is configured to associate each of a plurality of times having elapsed since the occurrence of the concentration state with a predicted value representing a remaining duration time of the concentration state, and the specifier is configured to predict the remaining duration time of the concentration state by referring to the data access prediction information based on time elapsed since access concentration was detected, calculate speed of movement of the access concentration based on occurrence position of the access concentration and the time of the access concentration, obtain predicted access concentration region based on the remaining duration time of the concentration state and speed of movement of the access concentration, and specify the predicted access concentration region as the unit region to be migrated.

8. The information processing apparatus according to claim 1, further comprising a migration determiner is configured to compare a loss and a gain that are resulting from prospective migration of the data between the first storing device and the second storing device and determines, in a case where the gain is larger than the loss, that the data is to be migrated.

9. The information processing apparatus according to claim 1, further comprising a predictor is configured to predict a position of occurrence of the concentration state, wherein the specifier specifies the unit region included in the position of occurrence of the concentration state to be the unit region storing data to be migrated between the first storing device and the second storing device.

* * * * *